US008818576B2

(12) United States Patent
Maldonado et al.

(10) Patent No.: US 8,818,576 B2
(45) Date of Patent: Aug. 26, 2014

(54) TAILORED ARRIVALS ALLOCATION SYSTEM TRAJECTORY PREDICTOR

(75) Inventors: Christie Marie Maldonado, Renton, WA (US); Ferdinando Dijkstra, Amstelveen (NL); Robert W. Mead, Covington, WA (US); Suzanne Elise Meador, Seattle, WA (US); Gregory T. Saccone, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 196 days.

(21) Appl. No.: 12/895,447

(22) Filed: Sep. 30, 2010

(65) Prior Publication Data

US 2012/0083946 A1 Apr. 5, 2012

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *G05D 1/08* | (2006.01) |
| *G05D 1/06* | (2006.01) |
| *G06F 19/00* | (2011.01) |

(52) U.S. Cl.
USPC ............. 701/4; 701/3; 701/5; 701/6; 701/7; 701/10; 701/18; 701/528

(58) Field of Classification Search
None
See application file for complete search history.

(56) References Cited

U.S. PATENT DOCUMENTS

| | | | |
|---|---|---|---|
| 4,642,775 A | 2/1987 | Cline et al. | |
| 4,825,374 A * | 4/1989 | King et al. | 701/5 |
| 6,163,744 A * | 12/2000 | Onken et al. | 701/3 |
| 6,278,965 B1 | 8/2001 | Glass et al. | |
| 6,393,358 B1 | 5/2002 | Erzberger et al. | |
| 6,507,782 B1 * | 1/2003 | Rumbo et al. | 701/121 |
| 6,584,400 B2 | 6/2003 | Beardsworth | |
| 6,604,044 B1 | 8/2003 | Kirk | |
| 6,606,553 B2 | 8/2003 | Zobell et al. | |
| 6,816,780 B2 * | 11/2004 | Naimer et al. | 701/467 |
| 6,873,903 B2 | 3/2005 | Baiada et al. | |
| 7,024,287 B2 * | 4/2006 | Peckham et al. | 701/3 |
| 7,248,963 B2 | 7/2007 | Baiada et al. | |
| 7,269,486 B2 * | 9/2007 | Artini | 701/3 |

(Continued)

FOREIGN PATENT DOCUMENTS

| | | |
|---|---|---|
| EP | 1818891 | 8/2007 |
| EP | 1995706 A2 | 11/2008 |

(Continued)

OTHER PUBLICATIONS last.pdf (Free Online Dictionary, last—definition of last by the Free Online Dictionary, Thesaurus and Encyclopedia., Jan. 2, 2014, http://www.thefreedictionary.com/last, pp. 1-6).*

(Continued)

*Primary Examiner* — Khoi Tran
*Assistant Examiner* — Bao Long T Nguyen
(74) *Attorney, Agent, or Firm* — Yee & Associates, P.C.

(57) ABSTRACT

The different advantageous embodiments provide a system for generating trajectory predictions for a flight comprising a flight object manager and a trajectory predictor. The flight object manager is configured to generate flight information using a number of flight plans, a number of flight schedules, and flight status information. The trajectory predictor is configured to receive flight information from the flight object manager and use the flight information to generate the trajectory predictions.

20 Claims, 10 Drawing Sheets

(56) References Cited

U.S. PATENT DOCUMENTS

| | | | |
|---|---|---|---|
| 7,271,740 B2 | 9/2007 | Fischer | |
| 7,313,475 B2 | 12/2007 | Green | |
| 7,366,591 B2 * | 4/2008 | Hartmann et al. | 701/4 |
| 7,599,847 B2 | 10/2009 | Block et al. | |
| 7,606,641 B2 | 10/2009 | Allen | |
| 7,619,555 B2 | 11/2009 | Rolfe | |
| 7,669,270 B2 | 3/2010 | Hutton | |
| 7,702,427 B1 * | 4/2010 | Sridhar et al. | 701/4 |
| 7,925,394 B2 | 4/2011 | Deker et al. | |
| 8,014,907 B2 | 9/2011 | Coulmeau | |
| 8,032,268 B2 | 10/2011 | Burgin et al. | |
| 8,090,531 B2 * | 1/2012 | Goutelard et al. | 701/466 |
| 2003/0050746 A1 | 3/2003 | Baiada et al. | |
| 2004/0078136 A1 * | 4/2004 | Cornell et al. | 701/120 |
| 2004/0193362 A1 | 9/2004 | Baiada et al. | |
| 2006/0022845 A1 | 2/2006 | Fischer | |
| 2007/0219679 A1 | 9/2007 | Coulmeau | |
| 2008/0098539 A1 | 5/2008 | Hutton | |
| 2008/0154448 A1 | 6/2008 | Mead et al. | |
| 2008/0177432 A1 | 7/2008 | Deker et al. | |
| 2008/0186222 A1 | 8/2008 | Rolfe | |
| 2009/0092074 A1 | 4/2009 | Jamalipour et al. | |
| 2010/0082185 A1 * | 4/2010 | Grattard et al. | 701/3 |
| 2010/0082186 A1 | 4/2010 | Burgin et al. | |
| 2010/0241345 A1 | 9/2010 | Cornell et al. | |
| 2010/0324812 A1 * | 12/2010 | Sacle et al. | 701/206 |
| 2010/0332111 A1 * | 12/2010 | Closse et al. | 701/120 |
| 2012/0083997 A1 | 4/2012 | Meador et al. | |

FOREIGN PATENT DOCUMENTS

| | | |
|---|---|---|
| WO | 2009082785 A1 | 7/2009 |
| WO | 2012044405 | 4/2012 |
| WO | 2012044406 | 4/2012 |

OTHER PUBLICATIONS

Li et al., "Identity-based Secure Communications with Aircraft", U.S. Appl. No. 12/904,339, filed Oct. 14, 2010, 38 pages.

PCT Search Report and Written Opinion dated Jul. 26, 2010 regarding international application No. PCT/US2010/024722, applicant The Boeing Company, 19 pages.

Baek et al., "A Survey of Identity-Based Cryptography, Proceedings of Australian Unix Users Group Annual Conference", 2004, 10 pages.

Robinson et al., "Impact of Public Key Enabled Applications on the Operation and Maintenance of Commercial Airplanes", AIAA Aviation Technology Integration and Operations (ATIO) Conference, Sep. 2007, 10 pages.

Weitz, "An analysis of merging and spacing operations with continuous descent approaches", 24th Digital Avionics Systems Conference, vol. 1, Oct./Nov. 2005 (Abstract).

USPTO Office Action dated Jun. 22, 2012 for U.S. Appl. No. 12/904,339, 17 pages.

USPTO Office Action dated Nov. 28, 2011 for U.S. Appl. No. 12/405,865, 12 pages.

PCT Search Report dated Nov. 25, 2011, regarding International Application No. PCT/US2011/047979 dated Aug. 16, 2011, issued by International Searching Authority.

Coppenbarger et al., "Field Evaluation of the Tailored Arrivals Concept for Datalink-Enabled Continuous Descent Approach", 7th AIAA ATIO Conference, Sep. 18, 2007, 14 pgs., AIAA, Belfast.

Korn et al., "4D Trajectory Management in the Extended TMA: Coupling AMAN and 4D FMS for Optimized Approach Trajectories", 25th International Congress of the Aeronautical Sciences, Sep. 3-8, 2006, 10 pgs., Hamburg.

PCT Search Report dated Dec. 5, 2011, regarding International Application No. PCT/US2011/047964 dated Aug. 16, 2011, issued by International Searching Authority.

U.S. Appl. No. 12/405,865, filed Mar. 17, 2009, Cornell et al.

U.S. Appl. No. 12/895,400, filed Sep. 30, 2010, Meador et al.

Oprins et al., "Impact of Future Time-Based Operations on Situation Awareness of Air Traffic Controllers", Paper 16, Eighth USA/Europe Air Traffic Management Research and Development Seminar, Napa, CA, Jun. 2009, pp. 1-10.

Coppenbarger et al., "Design and Development of the En Route Descent Advisor (EDA) for Conflict-Free Arrival Meeting", AIAA-2004-4875, AIAA Guidance, Navigation, and Control Conference, Providence, RI, Aug. 16-19, 2004, pp. 1-19.

FAA Order 8260.40B, "Flight Management System (FMS) Instrument Procedures Development", U.S. Department of Transportation Federal Aviation Administration, Dec. 31, 1998, pp. 1-78.

Final office action dated Sep. 7, 2012 regarding U.S. Appl. No. 12/405,865, 12 pages.

Final Office Action, dated Mar. 13, 2013, regarding USPTO U.S. Appl. No. 12/904,339, 34 pages.

Office Action, dated Jun. 12, 2013, regarding USPTO U.S. Appl. No. 12/895,400, 33 pages.

Non-final office action dated Aug. 1, 2013 regarding U.S. Appl. No. 12/904,339, 20 pages.

Notice of Allowance, dated Nov. 7, 2013, regarding USPTO U.S. Appl. No. 12/895,400, 23 pages.

* cited by examiner

KINEMATIC SYSTEM OF
EQUATIONS
(IN VECTOR FORM)
600

FIG. 6

TIME DERIVATIVE OF THE STATE VECTOR 602

UNCONTROLLED INPUTS 606

$$\begin{bmatrix} \dot{x} \\ \dot{y} \\ \dot{h} \\ \dot{V} \\ \dot{\psi} \\ \dot{m} \end{bmatrix} = \begin{bmatrix} V \cos(\gamma) \sin(\psi) \\ V \cos(\gamma) \cos(\psi) \\ V \sin(\gamma) \\ \frac{T-D}{m} V - g \sin(\gamma) \\ L \frac{\sin(\varphi)}{mV \cos(\gamma)} \\ Q \end{bmatrix} + \begin{bmatrix} W_x \\ W_y \\ W_z \\ 0 \\ 0 \\ 0 \end{bmatrix} \text{ with, } \begin{aligned} L &= mg \frac{\cos(\gamma)}{\cos(\varphi)} \\ C_L &= \frac{2L}{\rho V^2 S} \\ C_D &= C_{D0} + K C_L^2 \\ D &= \frac{1}{2} C_D \rho V^2 S \end{aligned}$$

604 CONTROLLED INPUTS

DIRECT ROUTING IMPLEMENTATION
1000

FIG. 10

FLIGHT PLAN ROUTE 1002

WAYPOINT 1004

1008 DIRECT ROUTING

1006 FLIGHT SURVEILLANCE REPORTS

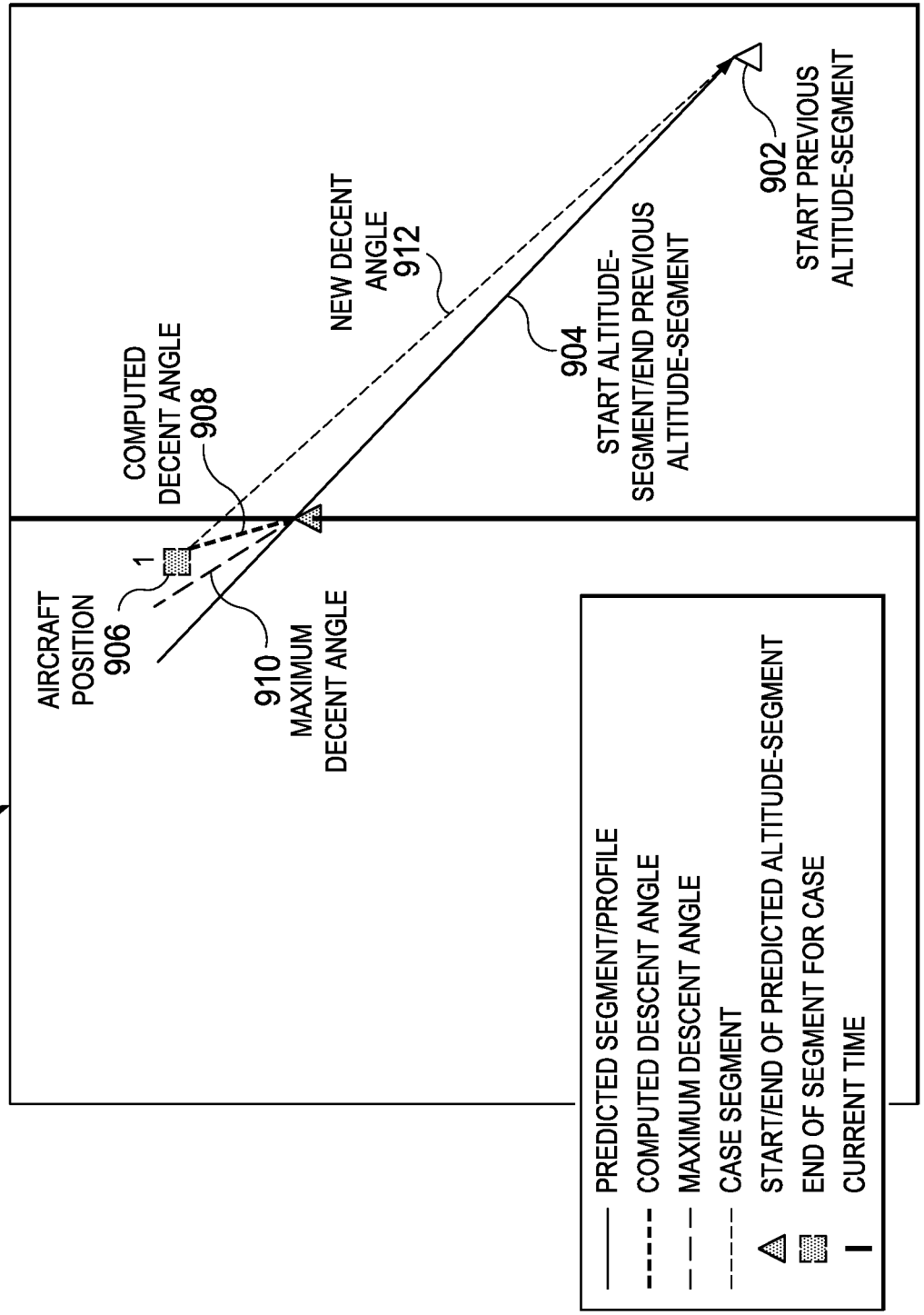

TAILORED ARRIVALS ALLOCATION SYSTEM TRAJECTORY PREDICTOR

CROSS REFERENCE TO RELATED APPLICATIONS

This application is related to commonly assigned and co-pending U.S. patent application Ser. No. 12/895,400 entitled "Tailored Arrivals Allocation System Clearance Generator" all of which are hereby incorporated by reference.

BACKGROUND INFORMATION

1. Field:

The present disclosure relates generally to a data processing system and more particularly to a system for tailored arrivals allocation. Still more particularly, the present disclosure relates to a trajectory predictor for a tailored arrivals allocation system.

2. Background:

Flight management involves several variables, including aircraft intent and airspace resources. The aircraft intent may be realized from the flight plan of a particular aircraft. The airspace resources available to a particular flight may vary according to runway configurations, airway availability, airspace volumes, and other constraints. Reconciling the intent of an aircraft using airspace resources with the managers of airspace resources as well as other airspace users is part of flight management.

Aircraft intent information is received from disparate sources, and the distributed nature of the information results in different formats and semantics by which the information is expressed. The intent information also becomes available at different stages of a flight's progression and to different actors. The combination of these intents with potentially conflicting needs of air traffic management needs to be provided in a timely fashion so as to allow for maximum use of airspace resources.

Therefore, it would be advantageous to have a method and apparatus that addresses one or more of the issues discussed above.

SUMMARY

The different advantageous embodiments provide a system for generating trajectory predictions for a flight comprising a flight object manager and a trajectory predictor. The flight object manager is configured to generate flight information using a number of flight plans, a number of flight schedules, and flight status information. The trajectory predictor is configured to receive flight information from the flight object manager and use the flight information to generate the trajectory predictions.

The different advantageous embodiments further provide a method for generating trajectory predictions. Flight information associated with an aircraft is retrieved. The flight information includes a flight plan. A determination is made as to whether a current heading for the aircraft is equal to an expected course of a flight plan. In response to a determination that the current heading for the aircraft is equal to the expected course of the flight plan, trajectory integration is initialized.

The different advantageous embodiments further provide an apparatus for generating trajectory predictions comprising a segment sequence manager and a plurality of databases. The segment sequence manager is configured to generate the trajectory predictions using flight information. The plurality of databases are in communication with the segment sequence manager and configured to store the flight information and the trajectory predictions.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 6 is an illustration of a kinematic system of equations in accordance with an advantageous embodiment;

FIG. 9 is an illustration of a segment prediction in accordance with an advantageous embodiment;

FIG. 10 is an illustration of a direct routing implementation in accordance with an advantageous embodiment.

DETAILED DESCRIPTION

Figure 1:
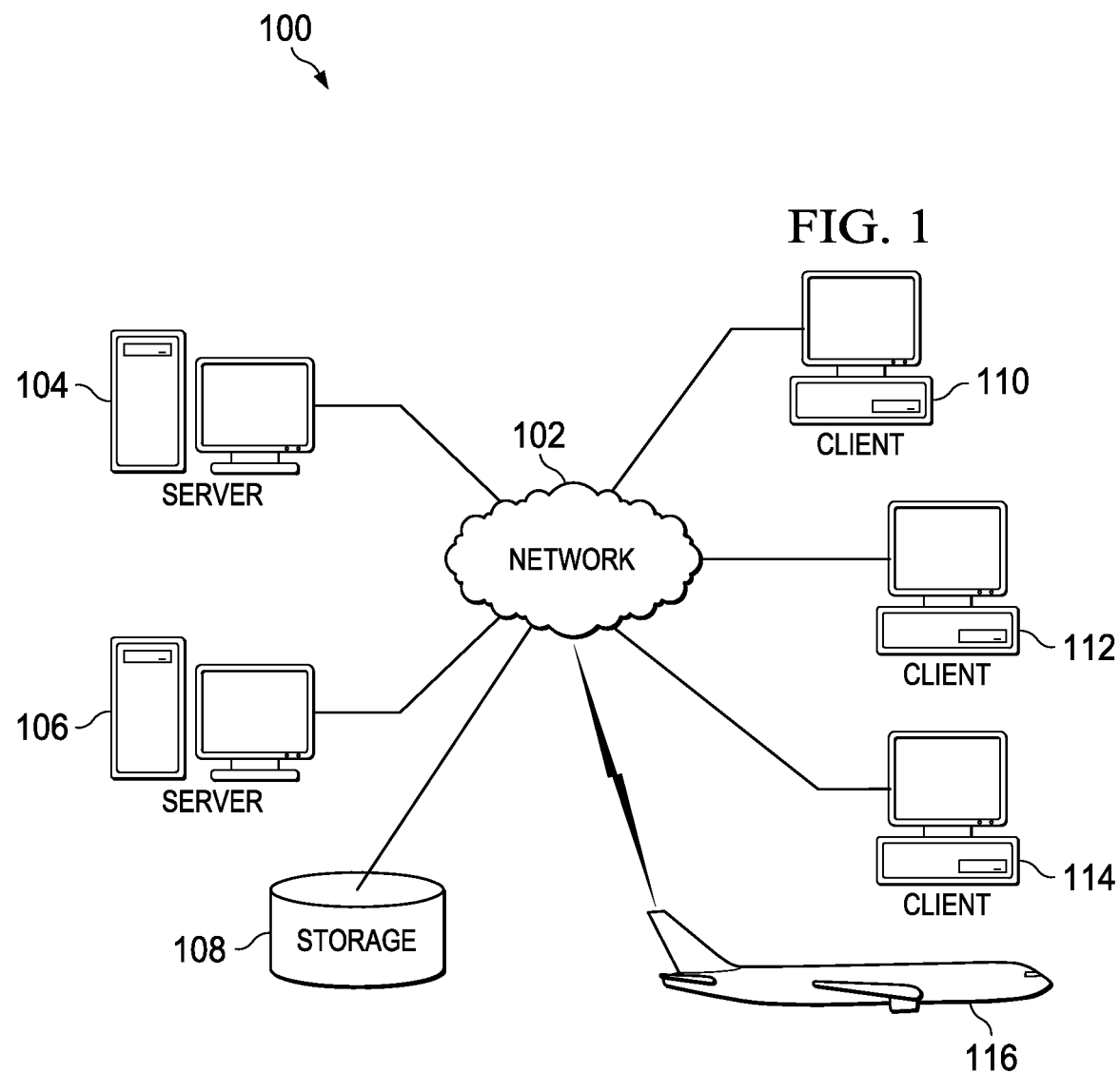
FIG. 1 is a pictorial representation of a network of data processing systems in which the advantageous embodiments of the present invention may be implemented.
Figure 2:
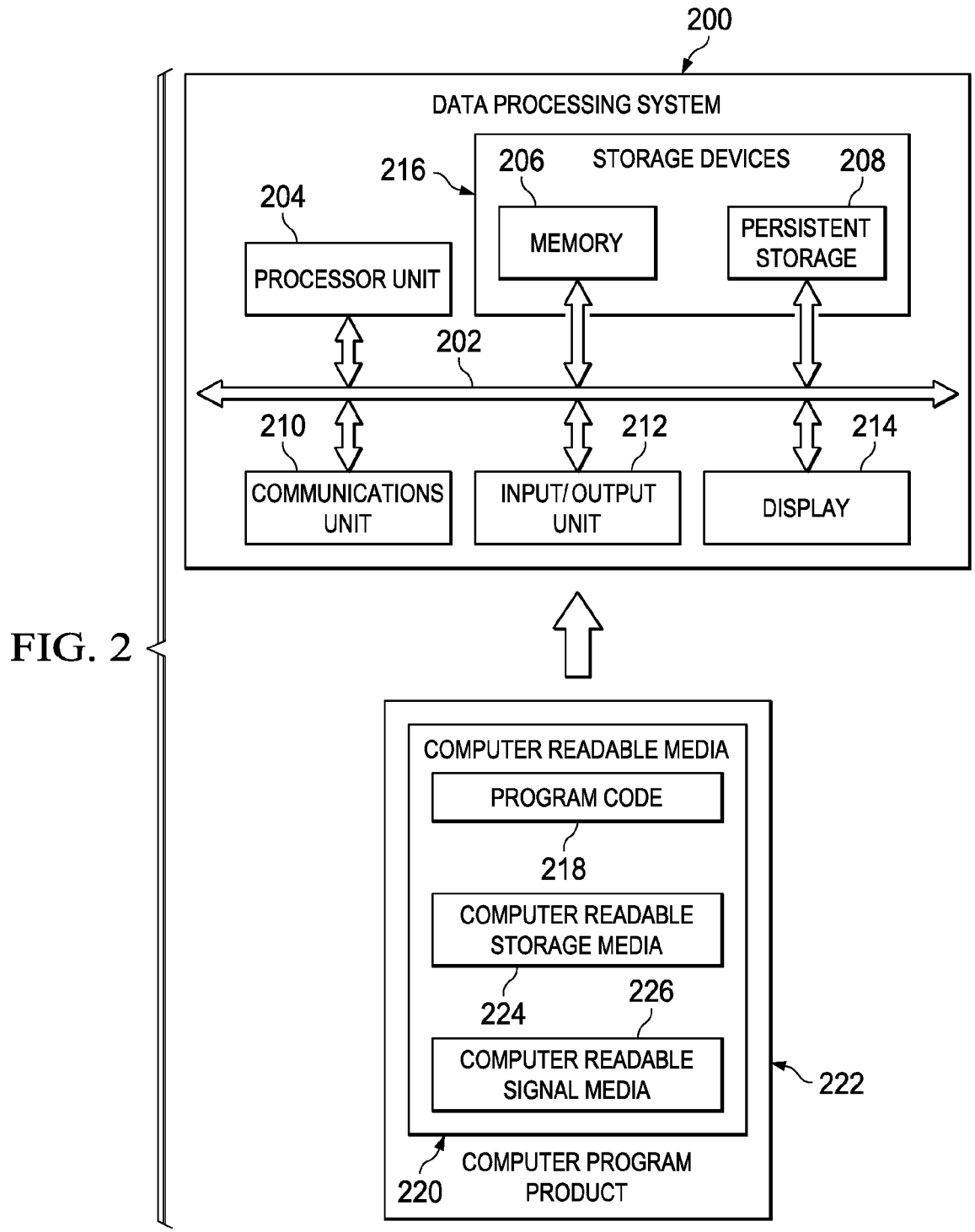
FIG. 2 is an illustration of a data processing system in accordance with an advantageous embodiment.

With reference now to the figures and in particular with reference to FIGS. 1-2, illustrative diagrams of data processing environments are provided in which the advantageous embodiments of the present invention may be implemented. It should be appreciated that FIGS. 1-2 are only illustrative and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight and/or any other type of communications link while on the ground. In these examples, server 104, server 106, client 110, client 112, and client 114 may be computers. Network data processing system 100 may include additional servers, clients, and other devices not shown.

In the depicted example, network data processing system 100 is the Internet with network 102 representing a worldwide collection of networks and gateways that may use the Transmission Control Protocol/Internet Protocol (TCP/IP) suite of protocols or other functionally similar communication protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

The different advantageous embodiments recognize and take into account that current systems do not support the function of establishing a trajectory based on modified aircraft intent for the purpose of achieving target arrival timing in the most flight-efficient way possible. The trajectory needs to be customized with applicable vertical, lateral, speed, and time constraints to consistently match the desired outcome. Such tailoring flexibility, in addition to the primary function of generating a trajectory prediction using modified aircraft intent, is not found in current trajectory prediction solutions.

Thus, the different advantageous embodiments provide a system for generating trajectory predictions for a flight comprising a flight object manager and a trajectory predictor. The flight object manager is configured to generate flight information using a number of flight plans, a number of flight schedules, and flight status information. The trajectory predictor is configured to receive flight information from the flight object manager and use the flight information to generate the trajectory predictions.

The different advantageous embodiments further provide a method for generating trajectory predictions. Flight information associated with an aircraft is retrieved. The flight information includes a flight plan. A determination is made as to whether a current heading for the aircraft is equal to an expected course of a flight plan. In response to a determination that the current heading for the aircraft is equal to the expected course of the flight plan, trajectory integration is initialized.

The different advantageous embodiments further provide an apparatus for generating trajectory predictions comprising a segment sequence manager and a plurality of databases. The segment sequence manager is configured to generate the trajectory predictions using flight information. The plurality of databases is in communication with the segment sequence manager and configured to store the flight information and the trajectory predictions.

Figure 3:
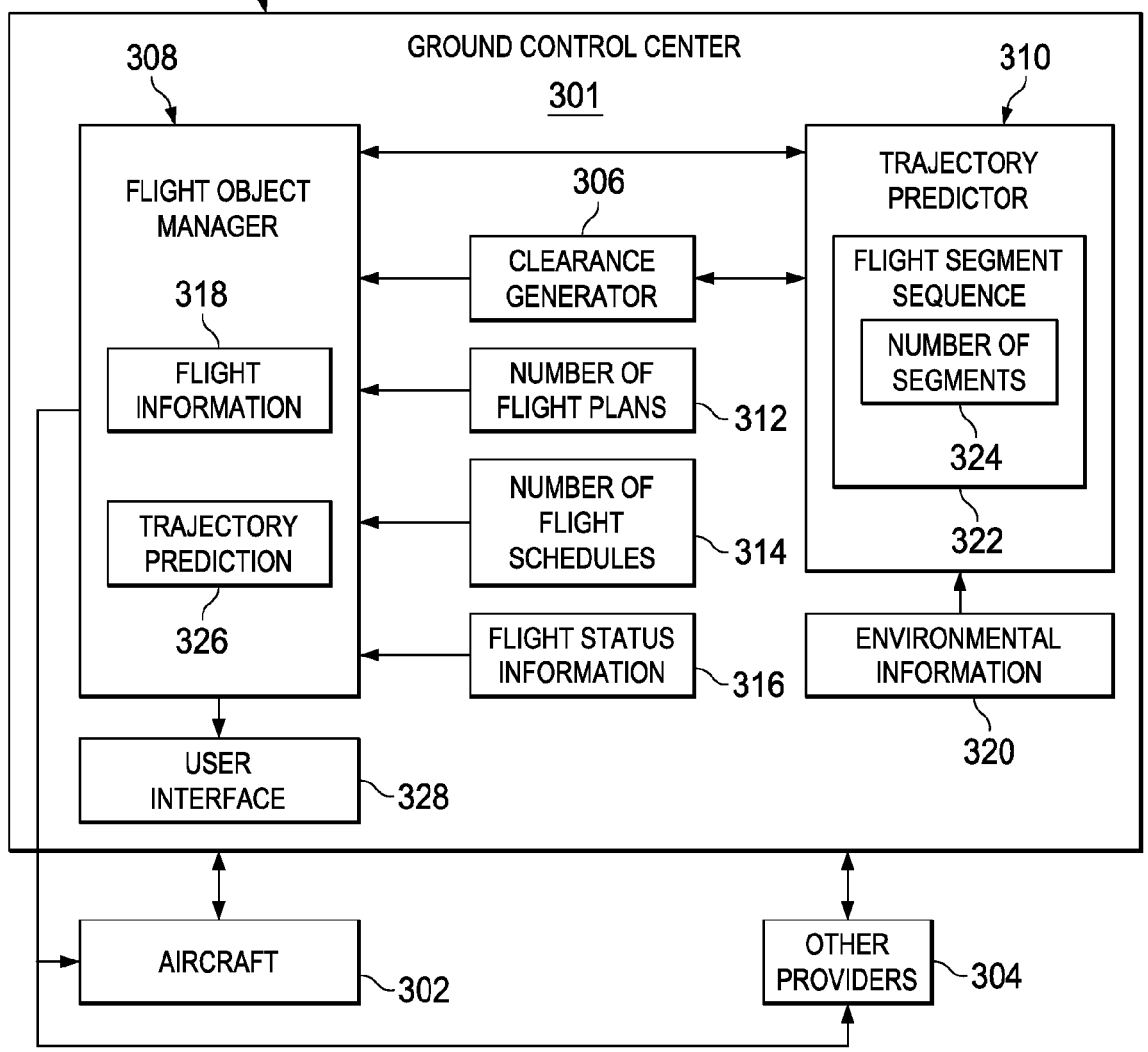
FIG. 3 is an illustration of a flight management environment in accordance with an advantageous embodiment.

Turning now to FIG. 3, an illustration of a flight management environment is depicted in accordance with an advantageous embodiment. Flight management environment 300 is an illustrative example of an environment that may be implemented in network data processing system 100 in FIG. 1.

Flight management environment 300 includes ground control center 301, aircraft 302, and other providers 304. Ground control center 301 may be an airspace resource manager, such as, for example, an aircraft operations center or air traffic control. Ground control center 301 communicates with aircraft 302 and other providers 304 using a network, such as network 102 in FIG. 1. Other providers 304 may include, for example, without limitation, air navigation service providers, weather information providers, and/or any other suitable provider of information related to flight management.

Ground control center 301 includes clearance generator 306, flight object manager 308, and trajectory predictor 310. In one advantageous embodiment, clearance generator 306 and trajectory predictor 310 may be part of a tailored arrivals allocation system implemented at ground control center 301. Clearance generator 306 provides an efficient trajectory arrival management solution by combining aircraft operator and aircrew preferences with air traffic situation information and weather information. Clearance generator 306 uses knowledge of airborne automation, aircraft performance, and airspace resources to generate solutions. In an illustrative example, a solution may be an integrated aircraft clearance that meets the needs and intent of the aircraft within the constraints applicable for the airspace. Clearance generator 306 processes the availability of the required airspace resources, up to and including the landing runway, against airline and aircraft preferences to produce a corresponding clearance for each individual aircraft. The result is achieved by incorporating constraints and/or asserting modifications to the extent needed to satisfy resource constraints and facilitate operator preferences with minimal impairment.

Trajectory predictor 310 produces a four-dimensional trajectory predictions, or four-dimensional trajectory solutions, by analyzing a number of factors including, without limitation, aircraft and airline preference information, applicable route and airspace constraints, environmental information, timing, and aircraft intent when triggered by recognized embodiments, such as a flight object manager. In an arrival system, such as the tailored arrivals allocation system, trajectory predictor 310 processes preferred aircraft routing and desired metering time received from clearance generator 306 to produce a four-dimensional trajectory prediction. A four-dimensional trajectory prediction is a trajectory prediction that provides information in the four dimensions of latitude, longitude, altitude, and time. Trajectory predictor 310 applies derived angle data as well as applicable constraints, such as weather information, airspace information, configuration data, and time over waypoints, to a selected construction technique in order to generate a four-dimensional trajectory prediction. The configuration data may contain details on which of a number of construction techniques the trajectory predictor should follow, or select, for cases when the required information for trajectory construction is not available or when the aircraft behavior differs from the profile predictions. In an illustrative example, a selected construction technique may be a technique that satisfies local site operation and/or aircraft operator preferences. There may be cases when the trajectory predictor may combine a number of different construction techniques to obtain a higher level of prediction to the destination airport. Each trajectory prediction generated by trajectory predictor 310 is tailored for an individual aircraft's needs and is sufficiently accurate to allow uninterrupted predictions of flight from the current position of an aircraft to the runway threshold, which may be used in determining arrival route clearances into the destination aerodrome.

Flight object manager 308 is a piece of software of an arrival system, such as the tailored arrivals allocation system, which retrieves information from number of flight plans 312, number of flight schedules 314, and flight status information 316, and consolidates the information retrieved to form flight information 318. Number of flight plans 312 represents the intent of a number of aircraft corresponding to flights for the number of aircraft. For example, an aircraft may undertake a number of flights, and each flight may correspond to a specific flight plan. The flight plan represents the intent of the aircraft for that specific flight.

Number of flight schedules 314 is scheduling information that corresponds to each flight. Number of flight schedules 314 may be controlled by an external scheduler, or resource manager, in an illustrative example. Number of flight schedules 314 provides arrival schedules for flights using controlled times of arrival. In one illustrative example, an air navigation service provider may provide controlled times of arrival for a number of flights, presenting time windows in which each flight must arrive in order to perform metering of traffic, which allows avoidance of airspace and/or runway conflicts. Metering is a traffic management scheme that allows aircraft to be properly aligned in space before landing. In an illustrative example, the scheduler providing number of flight schedules 314 may provide the metering times and controlled times of arrival for each flight.

Flight status information 316 is dynamic, up-to-date information about the current status of individual flights. Flight status information 316 may include the position coordinates, speed, altitude, and time for a specific flight, as well as flight intent data provided by the flight management system or other ground automation. The information in flight status information 316 may be provided directly by aircraft 302 and/or through an aircraft operations system receiving surveillance updates from aircraft 302. Flight status information 316 may trigger clearance generator 306 to begin processing information to generate a clearance solution, which in turn triggers trajectory predictor 310 to generate a trajectory prediction, in some advantageous embodiments. Trajectory predictor 310 may calculate a trajectory for a flight based on aircraft performance data and constraints related to the flight plan for a specific flight provided by clearance generator 306, in some advantageous embodiment.

Constraints related to the flight plan may be, for example, without limitation, speed, time to a coordinate point in the airspace, and altitude constraints. The computation results from trajectory predictor 310 will be returned back to clearance generator 306 for evaluation and potentially generation of a clearance, in this example. Trajectory predictor 310 may receive multiple requests from clearance generator 306 in an effort to generate an optimum solution for a route.

In other advantageous embodiments, trajectory predictor 310 may receive a request for a trajectory prediction from an aircraft operations center, and/or air traffic control. In yet other advantageous embodiments, flight object manager 308 may trigger trajectory predictor 310 to perform updates or modification calculations for a trajectory. The result of this function's call for an update or modification is updated trajectory information that could be shared with other system functions within a tailored arrival allocation system, such as clearance generator 306, for example.

Environmental information 320 may include weather information such as wind speed, direction and temperature. Additionally, the environmental data may include, without limitation, constraints related to noise abatement procedures for the target airport.

Trajectory predictor 310 uses flight information 318 from flight object manager 308, along with environmental information 320, to generate flight segment sequence 322. Flight segment sequence 322 may include number of segments 324. Number of segments 324 is one or more segments, where each segment reflects a change in at least one of aircraft speed, flight direction, and/or vertical attitude. Trajectory predictor 310 integrates number of segments 324 to form trajectory prediction 326, which is output to flight object manager 308 and/or clearance generator 306.

When flight object manager 308 receives trajectory prediction 326 from trajectory predictor 310, flight object manager 308 may then distribute trajectory prediction 326 to the appropriate component within flight management environment 300 for message construction to interested parties, such as other providers 304 and/or user interface 328. User interface 328 may be, for example, a user interface of the aircraft operations center, and/or air traffic control.

When trajectory predictor 310 is triggered, trajectory predictor 310 establishes the lateral routing for the flight using flight information 318. In determining the start position of the lateral path, the trajectory predictor would search for any direct-to waypoint indication in the flight plan. If the flight plan indicates direct routing to a waypoint, trajectory predictor 310 will take the current aircraft position as the starting point for the lateral trajectory, and the indicated direct-to waypoint as the first waypoint in the lateral route, followed by the remainder of the lateral route as given in the flight plan. On the other hand, if direct routing has not been identified and current aircraft position is available, trajectory predictor 310 will take the current aircraft position as the starting point for the lateral trajectory followed by the full lateral route description as given in the flight plan. If there was a case where the aircraft position is not available, the trajectory predictor will take just the full lateral route description as given in the flight plan, taking as the starting point for the lateral trajectory the first waypoint listed on the flight plan. FIG. 10, below, provides an overview of the direct routing implementation 1000.

In order to construct the predicted trajectory, trajectory predictor 310 establishes two series of segments, which will be integrated jointly. The first series of segments contains segments which regulate the vertical trajectory. These segments are called altitude-segments, and are created from waypoints with associated altitude constraints. The second series of segments are the performance segments, created from points at which the aircraft target speeds change. The performance segments indicate the climb and/or descent angles that the aircraft would follow when its trajectory is unconstrained. In an illustrative example, with situations involving constrained trajectories, performance segments will indicate idle thrust or geometric angles depending on the construction settings for trajectory predictor 310.

The information required to construct the performance segments will be obtained from an aircraft performance model in trajectory predictor 310. The aircraft performance model will provide all performance related information, such as horizontal and vertical speeds, as well as acceleration and deceleration factors. The aircraft performance model may also provide predefined climb and descent angles, which may be used by trajectory predictor 310 in combination with speed information to generate the trajectory prediction. The mixed use of speed and angle information provides flexibility in terms of configuration and maintaining the behavior of trajectory predictor 310.

Trajectory predictor 310 can identify when detailed aircraft performance characteristics about a given aircraft's behavior is available to accurately derive target speeds. An illustrative example of this identification would be the case when a tailored arrival allocation system application is configured to work with an airline partner in which detailed information about the airlines flights could be known in advanced. When detailed information is not available, trajectory predictor 310 will integrate the vertical trajectory, possibly containing horizontal segments, by combining the information from the altitude and performance segment series. This approach provides further flexibility of trajectory predictor 310 for vertical path construction since the two segment series can act in a complementary fashion. This approach also extends the flexibility of trajectory predictor 310 because it makes achievable the construction of trajectories with or without proprietary aircraft performance data and/or on the basis of commercial arrangements with the targeted user's profiles.

At each point in the vertical trajectory, trajectory predictor 310 obtains the aircraft target vertical data from the performance segment. The performance segment may either contain a performance angle or provide a target horizontal speed vector and corresponding vertical speed vector. In the latter case, the performance angle will be derived from the two speed vectors. Once the performance angle has been established, the eventual angle that the aircraft will target needs to be calculated. It is assumed that the aircraft will control its vertical path by a vertical guidance system when a performance based angle is selected. Such systems take into account any ascent or descent winds the aircraft may encounter. After all angle information is computed, trajectory predictor 310 will determine the correct angle for the vertical integration based on a number of criteria. When the correct angle is selected, the vertical trajectory will be integrated to form a trajectory prediction.

The illustration of flight management environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
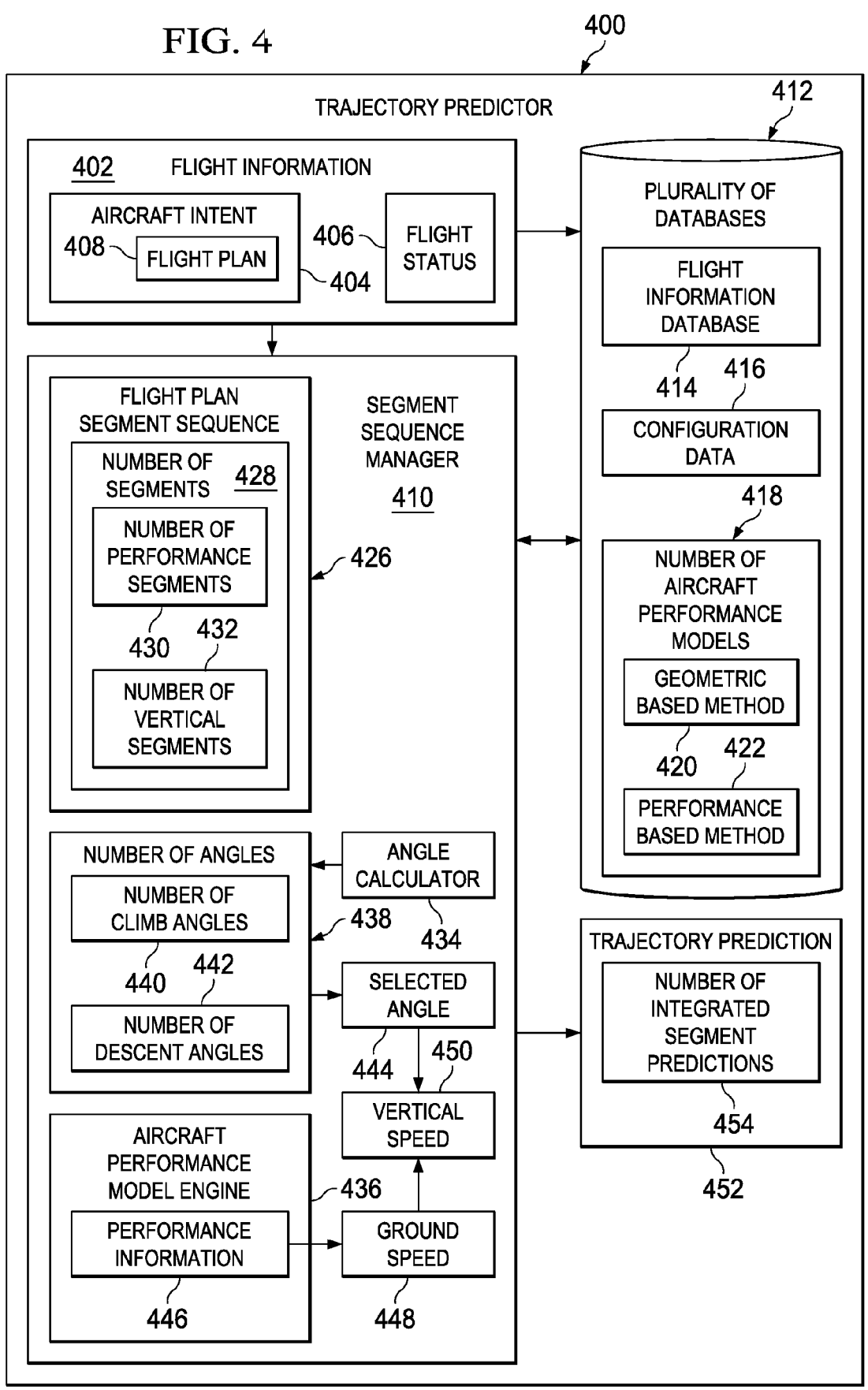
FIG. 4 is an illustration of a trajectory predictor in accordance with an advantageous embodiment.

Turning now to FIG. 4, an illustration of a trajectory predictor is depicted in accordance with an advantageous embodiment. Trajectory predictor 400 is an illustrative example of one implementation of trajectory predictor 310 in FIG. 3.

Trajectory predictor 400 receives flight information 402 from a flight object manager, such as flight object manager 308 in FIG. 3. Flight information 402 is an illustrative example of one implementation of flight information 318 in FIG. 3. Flight information 402 may include aircraft intent 404 and flight status 406. Aircraft intent 404 is the planned flight route, speeds, and cruising levels that an aircraft intends to follow for a flight. In other words, the aircraft intent expresses the airline needs for a particular flight excluding predicted path information, such as time and level information, along the route waypoints. Aircraft intent 404 may include, without limitation, flight plan 408, aircraft routing information, requested flight levels, requested speed schedules, air traffic control directed speeds, air traffic control directed flight levels, and/or any other suitable information regarding aircraft intent. Flight plan 408 is a flight plan on file with ground services for a specific flight of a specific aircraft. Flight plan 408 is also loaded into the flight management computer of the aircraft. If requested speed schedules and/or requested flight levels are not included in aircraft intent 404, trajectory predictor 400 will compute those during the trajectory prediction process, described below. Flight status 406 may include information about the current position in time and space of a given aircraft for which the trajectory prediction is being requested. For example, flight status 406 may provide the current aircraft heading, which is used by trajectory predictor 400 to determine if the current heading for the aircraft deviates from the expected course of a flight plan route. The current heading is the actual heading of an aircraft in real-time as determined by aircraft status information.

Trajectory predictor 400 includes segment sequence manager 410 and plurality of databases 412. Plurality of databases 412 may include, without limitation, flight information database 414, configuration data 416, number of aircraft performance models 418, and/or any other suitable database. Flight information database 414 may include stored information received from flight object manager 308 in FIG. 3, such as flight information 402.

Configuration data 416 may be predefined information stored in computer memory and/or in a database accessible to a trajectory predictor 400. Number of aircraft performance models 418 are models used by trajectory predictor 400 to predict how an aircraft will move through the air based on a number of factors. Number of aircraft performance models 418 may include, without limitation, geometric based method 420, performance based method 422, and/or any other suitable model.

Geometric based method 420 is a model based on a kinematic model using ascent, or climb, and descent angles derived from different sources to construct the trajectory. Geometric based method 420 is driven by fixed and/or predefined ascent and descent angles originated by observational data or historical data archived for a specific airport site. Geometric based method 420 may include a limited set of aircraft performance data. As such, geometric based method 420 is used to supplement the calculation of climb and descent angles as needed by segment sequence manager 410 of trajectory predictor 400. Climb and descent angles are needed to establish the correct angle for the vertical path of a trajectory prediction, as trajectory predictor 400 is an angle-driven function of a tailored arrival allocation system.

Performance based method 422 is based on a point mass model. Performance based method 422 provides trajectory predictor 400 with all performance related information, such as horizontal and vertical speeds, as well as acceleration and deceleration factors for specific aircraft types. Performance based method 422 may also provide predefined climb and descent angles, which may be used in combination with speed information by segment sequence manager 410 to generate trajectory predictions.

An aircraft in motion through the atmosphere is responding to the four forces of flight: lift, drag, thrust, and weight. The way in which the aircraft responds to these forces determines how fast the aircraft will fly, how high the aircraft can fly, how far the aircraft can fly, and so forth. Performance based method 422 is responsible for the estimation and prediction of the behavior of the aircraft as it moves through the air.

Performance based method 422 selected by trajectory predictor 400 will not be concerned about the details of aerodynamics or propulsion, but rather will make use of aerodynamics through the drag polar for a given aircraft, and will consider the propulsive device in terms of thrust available and the specific fuel consumption for the given aircraft.

Performance based method 422 will focus on the movement of the given airplane through the atmosphere, as it responds to the four forces of flight described above. This movement is governed by a set of equations called the equations of motion, which are typically covered by Newtonian Mechanics. The equations of motion can be described as the application of Newton's second law in three dimensional space and time, which yields a system of second order differential equations with six degrees of freedom. In order to simplify the equations, several assumptions may be made. First, that there is a flat non-rotating reference frame. Second, that the object is in equilibrium or constant acceleration or deceleration along the thrust vector axis. Third, that the mass of the object is concentrated at the center of mass. And fourth, that the longitudinal and lateral equations are decoupled. Following these assumptions results in a system of first order differential equations that describes the motion of a particle in Cartesian space. This system of equations is commonly labeled as the point mass model.

Performance based method is based off a point mass model, which balances the forces of lift, drag, thrust, and weight at the center of mass of the aircraft, as further depicted in FIG. 5, below. Another assumption may be introduced by assuming that the thrust vector is parallel to the velocity vector. This assumption, justified for cruise flight and small descent angles, allows the decoupling of the propulsion and lift equations with respect to the thrust. The end result will be a system of equations that defines relationships between speed, flight path angle, vertical rate, and fuel consumption, among other factors, as seen in simplified form in FIG. 6, below.

Segment sequence manager 410 uses flight information 402, as well as information retrieved from plurality of databases 412, to generate flight plan segment sequence 426. Flight plan segment sequence 426 is a sequence of segments for the entire trajectory of a flight plan, such as flight plan 408.

Flight plan segment sequence 426 includes number of segments 428. Number of segments 428 reflects changes in at least one of aircraft speed, flight direction, and vertical attitude along a trajectory. Number of segments 428 includes number of performance segments 430 and number of vertical segments 432. Number of performance segments 430 is one or more segments of the trajectory for a flight plan that represent points at which the aircraft target speeds change. Number of vertical segments 432 takes into account speed acceleration and/or deceleration with specific vertical speeds and acceleration or deceleration factors. Segment sequence manager 410 calculates the climb or descent angles along with each vertical segment to be used for integration of the vertical path of a trajectory prediction.

Segment sequence manager 410 also includes angle calculator 434 and aircraft performance model engine 436. Angle calculator 434 calculates climb and descent angles to be used for integration of number of vertical segments 432 into the vertical path of a trajectory prediction. Angle calculator 434 calculates number of angles 438 from which the final angle for calculation will be selected. In one illustrative example, angle calculator 434 calculates number of angles 438 from the horizontal and vertical speed vectors obtained from performance based method 422. In another illustrative example, angle calculator 434 retrieves geometric angles from databases, such as geometric based method 420. Angle calculator 434 further computes the minimum and maximum descent angles based on altitude constraints to determine whether there is a need to limit the angle of the calculated and/or retrieved angles to either the minimum or maximum angle. The altitude constraints may be inserted into flight information 402 and/or made available separately via environmental data. Number of angles 438 may include, without limitation, number of climb angles 440 and number of descent angles 442. Angle calculator 434 derives number of angles 438 based on potential parameters such as, without limitation, aircraft performance speeds, aircraft performance tables, predefined ascent and descent angle tables and ascent/descent winds, minimum and maximum ascent/descent angle based on applicable altitude constraints, and reported flight position.

Angle calculator 434 uses an approximation method to derive number of angles 438. In an illustrative example, angle calculator 434 may derive from a predicted performance angle for descent using the following steps. First, the algorithm finds the level along the performance segment at which the groundspeed is the lowest. The performance angle for the performance segment is then taken from the angle formed by the groundspeed vector and vertical speed vector at the level found. The equation used to establish the vertical speed vector, or Rate Of Descent (ROD), for a vertical segment may be:

$$ROD = \sin(\text{performance\_angle}) * \text{TrueAirSpeed\_with\_MaxWind\_impact}$$

The vertical speed vector is calculated from the performance angle of the segment and the True Air Speed (TAS) at the level found. This method also allows for inclusion of any descent winds that are entered and used in the trajectory predictor algorithms of a flight management system to better predict the aircraft behavior. Trajectory predictor 400 uses the most up-to-date atmospheric data, such as environmental information 320 in FIG. 3, when calculating the ROD for all vertical segments. In an illustrative example, if an aircraft's uplinked winds are available to trajectory predictor 400, that data may be used instead of regular wind information extracted from external meteorological sources to anticipate the descent angle that the vertical guidance system is going to choose during descent based on the winds the system thinks it will encounter. That descent angle may be locked in before or at time of descent. This allows for a better prediction of time of descent and the actual positioning of the vertical trajectory. The horizontal speeds along the trajectory will still be a function of the target speeds and the most accurate wind information available.

Aircraft performance model engine 436 uses number of aircraft performance models 418 from plurality of databases 412 to generate performance information 446. Performance information 446 is information about how a given aircraft will move in the atmosphere in response to the forces of flight.

Segment sequence manager 410 selects an angle from number of angles 438 to form selected angle 444. Selected angle 444 is the correct angle for the vertical integration based on a number of criteria. Number of angles 438 may be based on potential parameters such as, without limitation, aircraft performance speeds, aircraft performance tables, predefined ascent and descent angle tables and ascent/descent winds, minimum and maximum ascent/descent angle based on applicable altitude constraints, and reported flight position. The number of criteria for angle selection includes, but is not limited to, configured preferences for the airspace, airline, and/or aircraft type. Aircraft performance speeds may be obtained from performance information 446 generated by aircraft performance model engine 436. Aircraft performance tables provide default horizontal speeds, which may be based on observation of historical flights traversing the airspace involved and ascent and/or descent winds.

When two or more of number of angles 438 have been calculated by angle calculator 434, segment sequence manager 410 selects an angle to be used in the calculation based on predefined settings available via configuration data 416 and/or stored in flight plan 408. Selected angle 444 is used for further calculation by segment sequence manager 410. Aircraft performance model engine 436 selects an aircraft performance source, such as geometric based method 420 or performance based method 422, to use for calculations with selected angle 444. Segment sequence manager 410 integrates selected angle 444 for each segment within number of segments 428 to generate trajectory prediction 452 having number of integrated segment predictions 454. Each segment is characterized by a different angle because segments are formed based on where the aircraft attitude changes.

Segment sequence manager 410 integrates selected angle 444 with number of segments 428 by deriving vertical speed 450 using selected angle 444 and either True Air Speed (TAS) for performance based angles or groundspeed for geometric based angles 448. Groundspeed 448 may be calculated by aircraft performance model engine 436 by applying the wind at the corresponding altitude to the TAS vector at that altitude. The TAS may be calculated by converting the target speed at the corresponding altitude using the applicable atmospheric condition at that altitude. Using the vertical speed and the vertical integration step size, the time required for the vertical integration step can be calculated. The vertical integration step size consists of the vertical integration of the number of segments in a fixed predefined parameter, for example a 1,000 foot increment. The calculation may be the time it takes to traverse the 1,000 foot increment, in this illustrative example. Similarly, for the horizontal integration step, the step duration can be calculated from the horizontal integration step algorithm and the horizontal speed.

If the reported flight position indicates that the aircraft is already in ascent or descent, but is deviating from the predicted profile, trajectory predictor 400 will adjust the ascent or descent angle to match the actual situation. Trajectory predictor 400 will recognize the situation where the aircraft deviates from the predicted profile and starts to adhere to an unconstrained profile tailored towards the performance capabilities of the aircraft. If the unconstrained profile is allowable by air traffic management, trajectory predictor 400 will recognize the intent of the aircraft because the actual progress of the flight indicates that the constraints will not be upheld. These situations may occur during low traffic density hours, and/or when air traffic control lifts airspace constraints.

Figure 5:
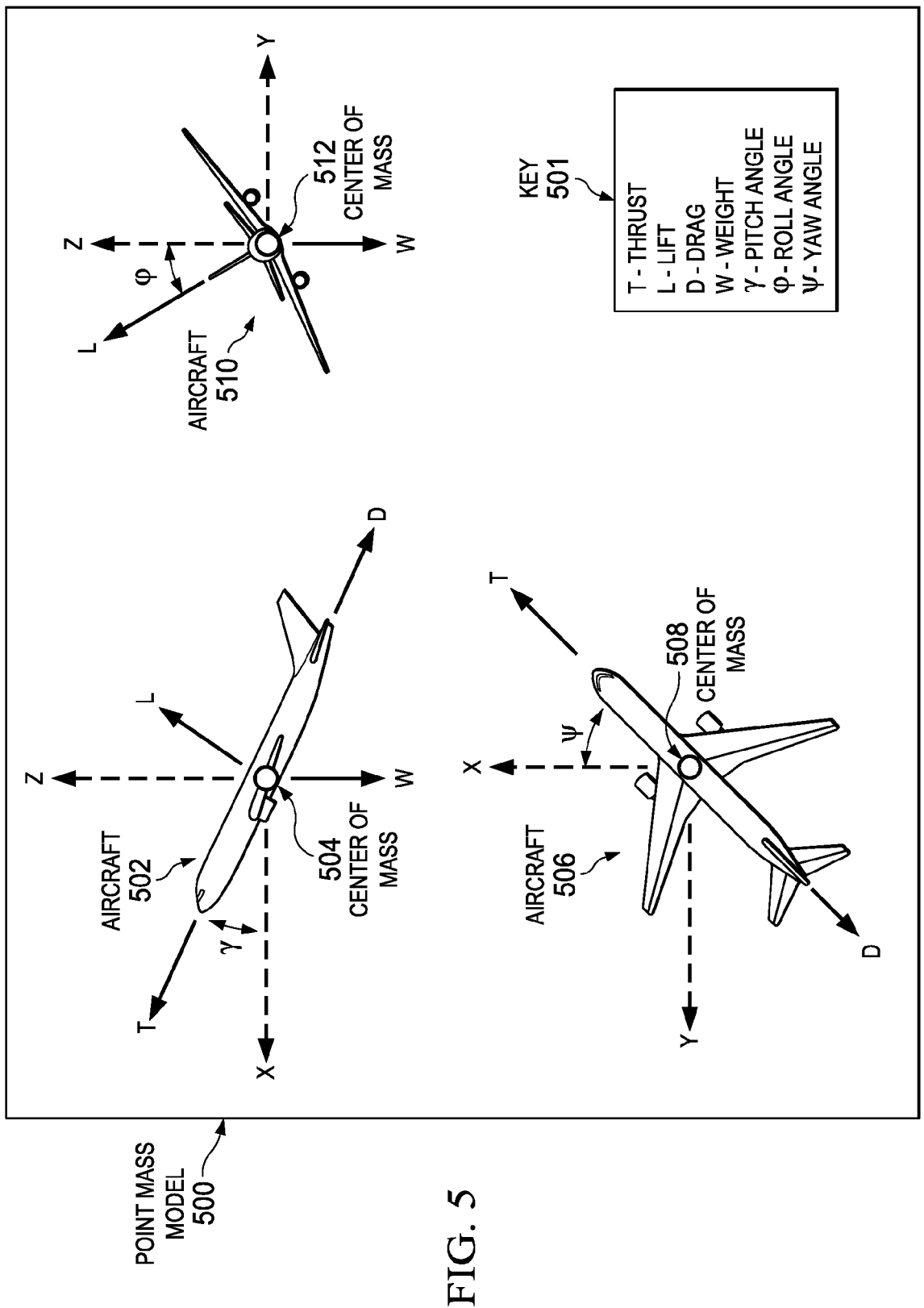
FIG. 5 is an illustration of a point mass model in accordance with an advantageous embodiment.

Turning now to FIG. 5, an illustration of a point mass model is depicted in accordance with an advantageous embodiment. Point mass model 500 is an illustrative example of one implementation of a point mass model on which performance based method 422 in FIG. 4 is based. The point mass model 500 will applied when the aircraft performance model engine 436 is configured to use the performance based method 422. The model provides the set of equations used to derive performance based angles for the performance based method 422.

Point mass model 500 depicts aircraft 502 with center of mass 504 responding to the forces of flight, namely thrust, lift, drag, and weight, as illustrated using key 501. Aircraft 506 with center of mass 508 similarly responds to the forces of thrust and drag. Aircraft 510 with center of mass 512 depicts a response to the forces of lift and weight, in this illustrative example.

Turning now to FIG. 6, an illustration of a kinematic system of equations is depicted in accordance with an advantageous embodiment. Kinematic system of equations 600 is an illustrative example of a simplified version of the equations used by a point mass model on which performance based method 422 in FIG. 4 is based.

Kinematic system of equations 600 is in vector form. The left side of the system of equations depicts time derivative of the state vector 602. The right side depicts two vectors, controlled inputs 604 and uncontrolled inputs 606. Controlled inputs 604 may include, for example, without limitation, thrust, drag, pitch angles, yaw angles, and the like. In an illustrative example, thrust may be controlled by the pilot or guidance systems of the aircraft via a throttle lever. Drag may also be controlled by the pilot by changes in the coefficient of drag, or spoilers, and the coefficient of lift, or flap settings, in an illustrative example. In an illustrative example, aircraft attitude may also be controlled by a pilot or guidance system of an aircraft, and yoke commands may be reflected in variations in the pitch, roll, and yaw angles. Uncontrolled inputs 606 may include, for example, without limitation, time averaged wind velocity components, discrete historical turbulence effects, and the like.

Figure 7:
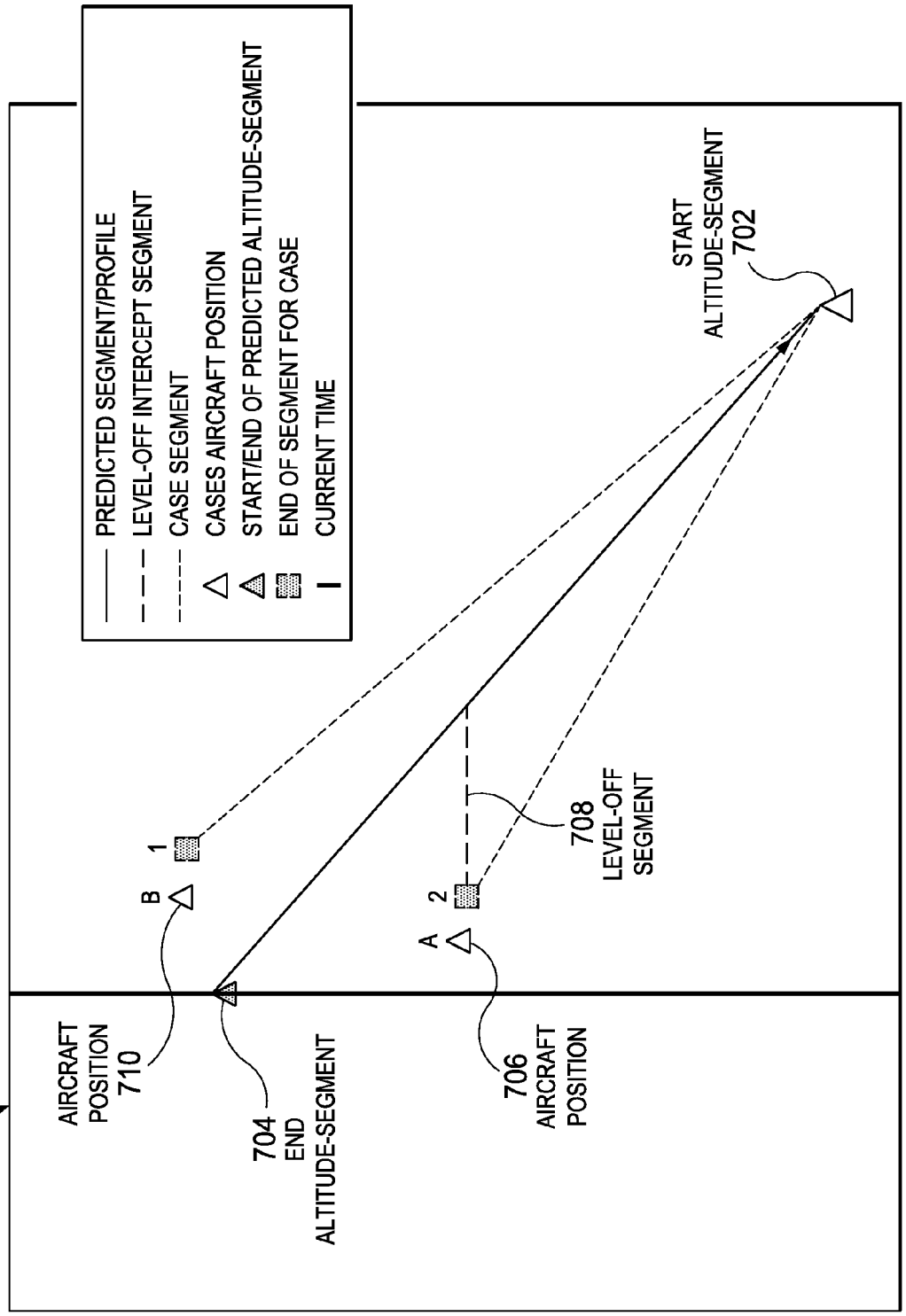
FIG. 7 is an illustration of a segment prediction in accordance with an advantageous embodiment.

Turning now to FIG. 7, an illustration of a segment prediction is depicted in accordance with an advantageous embodiment. Segment prediction 700 is an illustrative example of one implementation of number of integrated segment predictions 454 in FIG. 4.

The basic mechanism to adjust to an aircraft reported position in descent is by first determining where the current position is in relationship to the predicted path. The trajectory predictor determines if the aircraft is located above or below the vertical segment being integrated.

In this illustrative example, start altitude segment 702 and end altitude segment 704 depict the predicted segment, or path. Aircraft position 706 depicts an aircraft position that is below the segment predicted. In the situation of aircraft position 706, the trajectory predictor may have two options to resolve the difference. The first option is to calculate a level flight portion to intercept the current segment predictions, as depicted by level-off segment 708. This option will be selected when surveillance data is available in the flight plan and the surveillance data indicates that the vertical behavior of the flight is essentially level-flight.

The second option is to calculate a continuous descent from the reported position to the end of the segment by restarting the segment integration using the new angle to the start altitude segment. This option will be selected when surveillance data is available in the flight plan and the surveillance data indicates that the vertical behavior of the flight is a descent.

Aircraft position 710 depicts an aircraft position that is above the segment predicted. In this situation, a new angle for descent is calculated from the reported three-dimensional position of the aircraft to start altitude segment 702. The integration process is then reset to the start of the segment and integrated again, using the new angle.

If no vertical behavior is available in the flight plan, the decision will be driven by the configuration of the trajectory predictor. For example, when the configuration is set to an "aircraft-centric" value, the trajectory predictor will calculate a level-off segment as described above with regard to aircraft position 706 to resolve the offset of the segment.

Figure 8:
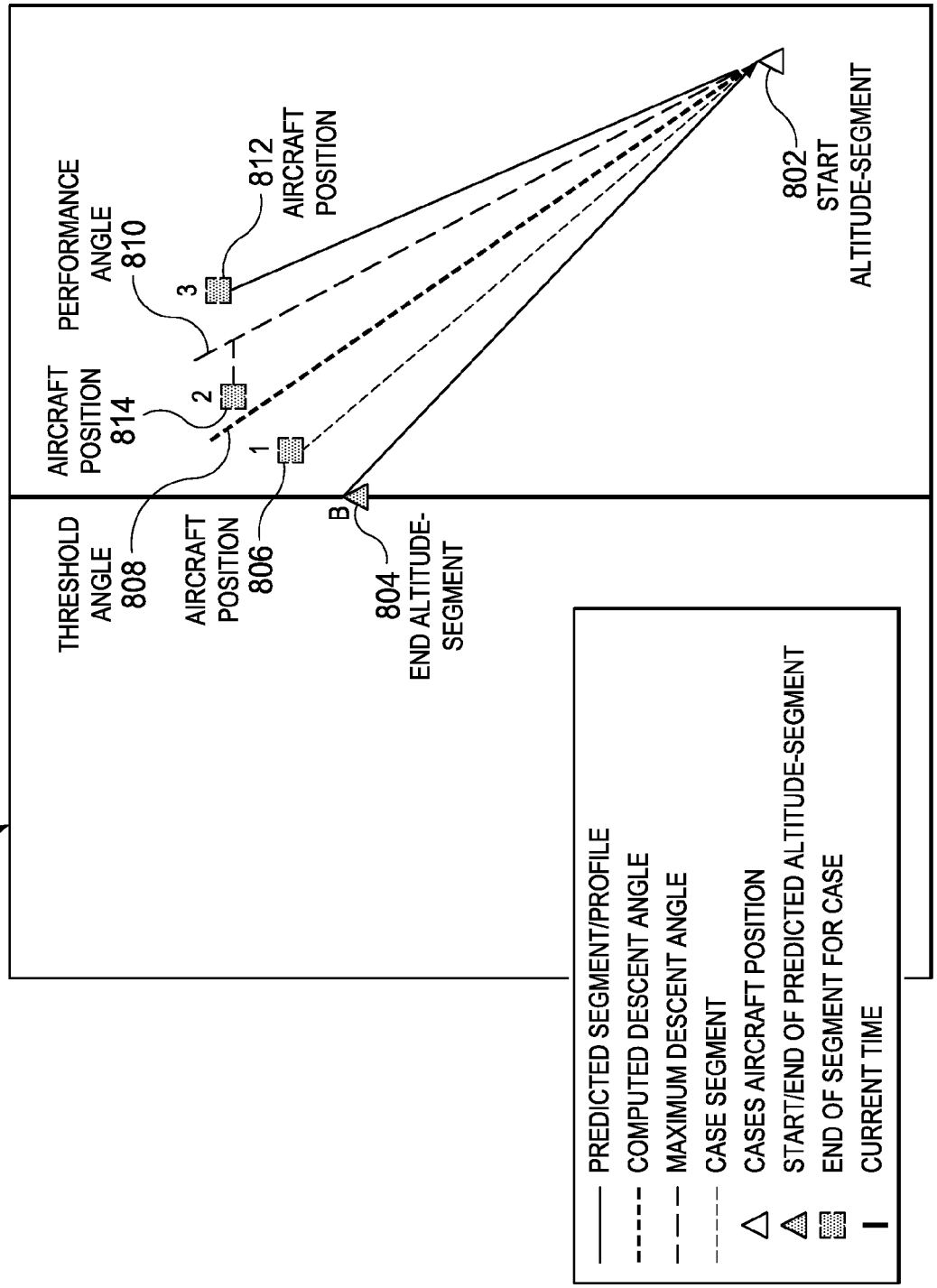
FIG. 8 is an illustration of a segment prediction in accordance with an advantageous embodiment.

Turning now to FIG. 8, an illustration of a segment prediction is depicted in accordance with an advantageous embodiment. Segment prediction 800 is an illustrative example of one implementation of number of integrated segment predictions 454 in FIG. 4.

Segment prediction 800 depicts a predicted segment, illustrated by start altitude segment 802 and end altitude segment 804. Aircraft position 806 is above the predicted segment in this illustrative example. In a situation where an aircraft is higher than an expected altitude, the trajectory predictor will apply threshold angle 808 above the predicted segment, assuming an unconstrained aircraft performance angle 810. This allows trajectory predictor to recognize the situation where an aircraft is allowed by air traffic control to disregard one or more altitude constraints. An unconstrained aircraft performance angle is the angle the aircraft would select to fly based on its own performance characteristics rather than those imposed by air traffic control altitude restrictions. Typically, air traffic control may force an aircraft down earlier due to constraints, such as crossing traffic. However, in this illustrative example, the aircraft itself, if it were alone in the airspace, may select to descend later to achieve the most beneficial performance angle for the aircraft.

The trajectory predictor is configured to adjust the predicted segment by calculating level flight for the aircraft from current aircraft position 814 until performance angle 810 is intercepted. If the aircraft continues to be above the predicted segment after the adjustments, as depicted by performance angle 810 and aircraft position 812, the trajectory predictor will calculate another continuous descent from the aircraft reported position. A similar approach may be taken when the aircraft is below the predicted segment and close to a shallow unconstrained performance angle.

Turning now to FIG. 9, an illustration of a segment prediction is depicted in accordance with an advantageous embodiment. Segment prediction 900 is an illustrative example of one implementation of number of integrated segment predictions 454 in FIG. 4.

The trajectory predictor will avoid unrealistic steep angle predictions when calculating descent angles using the reported aircraft position as the start of an altitude segment. Start previous altitude segment 902 and start altitude segment/end previous altitude segment 904 depict the predicted segment. The reported aircraft position is depicted by aircraft position 906 in this illustrative example. In this example, if computed descent angle 908 exceeds maximum descent angle 910, the vertical integration is restarted at a previous integration segment using a descent angle based on a continuous descent from reported position to the proceeding segment start point. The maximum descent angle may be retrieved from configuration data, such as configuration data 416 in FIG. 4. The starting point for restarting the integration at a previous integration segment will be the start point to which the computed descent angle is lower than the maximum descent angle.

Turning now to FIG. 10, an illustration of a direct routing implementation is depicted in accordance with an advantageous embodiment. Direct routing implementation 1000 may be performed by trajectory predictor 310 in FIG. 3.

When current aircraft position and/or intent information indicates that the aircraft is heading to a waypoint which is further down the expected route, beyond the next waypoint of the route in sequence, the trajectory predictor will assume a change in the projected flight plan route, triggering updates to the lateral calculations.

In this illustrative example, flight plan route 1002 is the expected route for a flight. Waypoint 1004 may be the waypoint beyond the next waypoint in sequence, which flight surveillance reports 1006 indicate the aircraft is heading towards. As such, trajectory predictor updates the lateral calculations for direct routing 1008, in this example.

Figure 11:
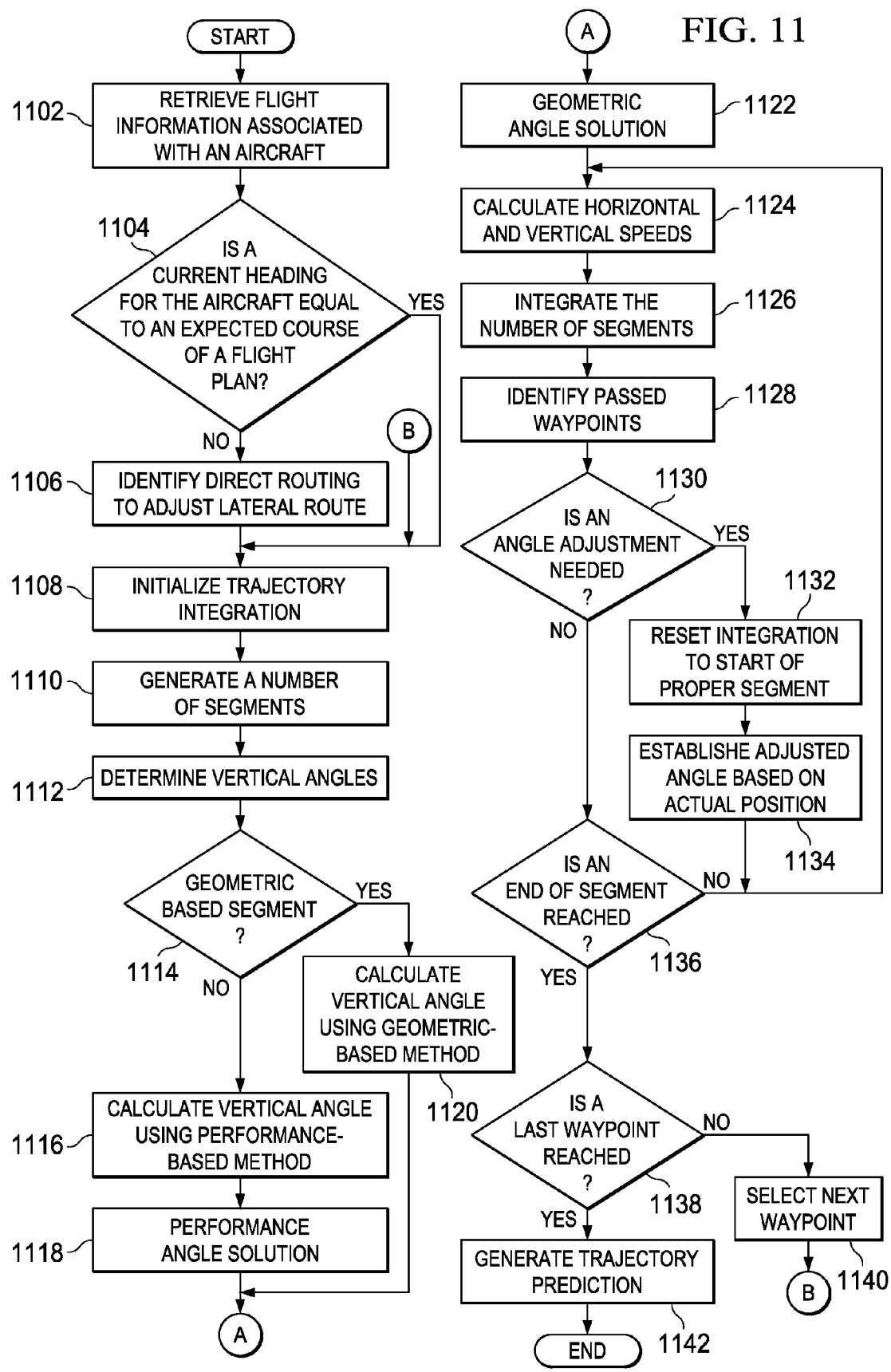
FIG. 11 is an illustration of a flowchart of a process for generating a trajectory prediction in accordance with an advantageous embodiment.

Turning now to FIG. 11, an illustration of a flowchart of a process for generating a trajectory prediction is depicted in accordance with an advantageous embodiment. The process in FIG. 11 may be performed by a component such as trajectory predictor 400 in FIG. 4.

The process begins by retrieving flight information associated with an aircraft (operation 1102). The flight information may be retrieved from a flight object manager, such as flight object manager 308 in FIG. 3. The process determines whether a current heading for the aircraft is equal to an expected course of a flight plan (operation 1104).

If a determination is made that the aircraft heading is not equal to the flight plan heading, the process identifies direct routing to adjust the lateral route (operation 1106), and proceeds to operation 1108. If a determination is made that the aircraft heading is equal to the flight plan heading, the process initializes trajectory integration (operation 1108). Trajectory integration is the integration of a number of segments by the trajectory predictor.

The process generates a number of segments (operation 1110). The number of segments reflects a change in at least one of aircraft speed, flight direction, and/or vertical altitude. The process determines a vertical angle (operation 1112)

The process determines whether it is a geometric based segment (operation 1114). Geometric descent is a fixed angle that is flown between waypoints, regardless of the aircraft performance and prevailing winds. The process may determine if it is a geometric based segment based on pre-configured settings, in one illustrative example. If a determination is made that the current segment is not a geometric based segment, the process calculates the vertical angle using the performance based method (operation 1116) and outputs a performance angle solution (operation 1118). If a determination is made that the current segment is a geometric based segment, the process calculates the vertical angle using the geometric based method (operation 1120) and outputs a geometric angle solution (operation 1122).

The process calculates horizontal and vertical speeds (operation 1124). The process integrates the number of segments (operation 1126). The process identifies passed waypoints (operation 1128). The process identifies the passed waypoints by determining at which time, distance, and altitude the aircraft crossed each point. During each integration step of a fixed vertical/horizontal distance, waypoints may be passed by the integration step.

The process determines whether an angle adjustment is needed (operation 1130). If a determination is made that an angle adjustment is needed, the process resets integration to start of proper segment (operation 1132) and establishes adjusted angle based on actual position of the aircraft (operation 1134), before continuing integration at operation 1124. A proper segment is the segment of which the angle formed by the aircraft position and the start point of the segment is less than the maximum angle. The process backs up the integration until the process finds an angle which is below the maximum angle.

If a determination is made that an angle adjustment is not needed, the process proceeds directly to operation 1136. The process determines whether the end of a segment is reached (operation 1136). If a determination is made that the end of the segment is not reached, the process returns to operation 1124. If a determination is made that the end of the segment is reached, the process then determines if a last waypoint is reached (operation 1138).

If a determination is made that the last waypoint is not reached, the process selects a next waypoint (operation 1140) and returns to operation 1108. If a determination is made that the last waypoint is reached, the process generates a trajectory prediction (operation 1142), with the process terminating thereafter.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account that current systems do not support the function of establishing a trajectory based on modified aircraft intent for the purpose of achieving target arrival timing in the most flight-efficient way possible. The trajectory needs to be consistent with applicable vertical, lateral, speed, and time constraints. Such tailoring flexibility, in addition to the primary function of generating a trajectory prediction using modified aircraft intent, is not found in current trajectory prediction solutions.

Thus, the different advantageous embodiments provide a system and method that generate the most accurate predicted aircraft trajectories from departure aerodromes all the way to destination aerodromes, covering all phases of flight. This system processes preferred aircraft routing and modified aircraft intent from a number of different systems to produce a four-dimensional trajectory solution. The predicted profile provided by these systems and methods is tailored for an individual aircraft's needs and is sufficiently accurate to allow uninterrupted flight from current position to runway for use in determining arrival route clearances into the destination aerodrome.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for generating trajectory predictions for a flight, the system comprising:
    a flight object manager configured to generate flight information using a number of flight plans, a number of flight schedules, and flight status information; and
    a trajectory predictor configured to receive flight information from the flight object manager and use the flight information to generate trajectory predictions, wherein the trajectory predictor is configured to:
        generate altitude segments comprising waypoints with associated altitude constraints for the flight,
        generate performance segments comprising points at which a speed of the flight changes and indicating vertical angles that the flight would follow,
        generate a vertical trajectory for the flight by combining information from the altitude segments and the performance segments, and
        generate vertical segments comprising speed acceleration factors or speed deceleration factors.

2. The system of claim 1, wherein the flight information includes aircraft intent and aircraft position.

3. The system of claim 1, wherein the flight status information includes at least one of position coordinates, speed, altitude, and time associated with an aircraft in flight.

4. The system of claim 1, wherein the trajectory predictor further adjusts a prediction of the segments for the flight based on altitude winds.

5. The system of claim 1, wherein the trajectory predictor is triggered by a clearance generator of a tailored arrivals allocation system to generate the trajectory predictions.

6. The system of claim 1, wherein the vertical angles that the flight would follow are the vertical angles that the flight would follow when a trajectory of an aircraft is unconstrained and wherein the flight status information is current flight status information.

7. The system of claim 1, wherein the vertical angles that the flight would follow when a trajectory of the aircraft is unconstrained are vertical descent angles.

8. The system of claim 1, wherein each flight schedule in the number of flight schedules comprises controlled time of arrival windows in which each flight in a plurality of flights must arrive.

9. The system of claim 1, wherein the trajectory predictor is configured to:
    determine whether each of the segments is a geometric based segment comprising a fixed angle flown between the waypoints regardless of a performance of the aircraft and winds,
    responsive to a determination that a segment is a geometric based segment, calculate a vertical angle using a geometric based method, wherein the geometric based method is a kinematic model using at least one of predefined descent angles or fixed descent angles,
    calculate a target horizontal speed vector and a target vertical speed vector, and
    integrate the segments using the target horizontal speed vector and the target vertical speed vector.

10. A method for generating trajectory predictions, the method comprising:
    retrieving, by a trajectory predictor from a flight object manager, flight information associated with an aircraft, wherein the flight information includes a flight plan, a flight schedule, and current flight status information, wherein the flight schedule comprises controlled time of arrival windows in which each flight in a plurality of flights must arrive;
    determining, by the trajectory predictor, whether a current heading for the aircraft is equal to an expected course of the flight plan;
    responsive to a determination that the current heading for the aircraft is equal to the expected course of the flight plan, initializing trajectory integration;
    generating, by the trajectory predictor, altitude segments comprising waypoints with associated altitude constraints for the aircraft;
    generating, by the trajectory predictor, performance segments comprising points at which a speed of the aircraft changes and indicating vertical descent angles that the aircraft would follow when a trajectory of the aircraft is unconstrained;
    generating, by the trajectory predictor, vertical segments comprising speed acceleration factors or speed deceleration factors; and
    generating, by the trajectory predictor, a vertical trajectory for the aircraft by combining information from the altitude segments and the performance segments.

11. The method of claim 10 further comprising:
    responsive to a determination that the current heading for the aircraft is not equal to the expected course of the flight plan, identifying direct routing to adjust a lateral route for the flight plan; and
    initializing trajectory integration.

12. The method of claim 10 further comprising:
    determining whether each of the segments is a geometric based segment comprising a fixed angle flown between the waypoints regardless of a performance of the aircraft and winds.

13. The method of claim 10 further comprising:
    responsive to a determination that a segment is a geometric based segment, calculating a vertical angle using a geometric based method, wherein the geometric based method is a kinematic model using at least one of predefined descent angles or fixed descent angles; and
    generating a geometric angle solution.

14. The method of claim 10 further comprising:
    responsive to a determination that a segment is not a geometric based segment, calculating a vertical angle using a performance based method; and
    generating a performance angle solution.

15. The method of claim 10 further comprising:
    calculating target horizontal speeds and target vertical speeds; and
    integrating the segments using the target horizontal speeds and target vertical speeds.

16. The method of claim 10 further comprising:
    identifying passed waypoints using the trajectory integration;
    determining whether an angle adjustment is needed;
    responsive to a determination that the angle adjustment is needed, resetting integration to a start of a proper segment;
    establishing an adjusted angle based on an actual position of the aircraft; and
    calculating target horizontal speeds and target vertical speeds.

17. The method of claim 10 further comprising:
    determining whether a last waypoint is reached; and
    responsive to a determination that the last waypoint is reached, generating a trajectory prediction.

18. An apparatus for generating trajectory predictions, the apparatus comprising:
    a segment sequence manager configured to generate the trajectory predictions using flight information by generating altitude segments comprising waypoints with associated altitude constraints for a flight, generating performance segments comprising points at which a speed of the flight changes and indicating vertical angles that the flight would follow when a trajectory of an aircraft is unconstrained, generating a vertical trajectory for the flight by combining information from the altitude segments and the performance segments, and generating vertical segments comprising speed acceleration factors or speed deceleration factors; and a plurality of databases in communication with the segment sequence manager and configured to store the flight information and the trajectory predictions, wherein the flight information includes current flight status information.

19. The apparatus of claim 18, wherein the plurality of databases include a number of aircraft performance models used by the segment sequence manager to calculate a number of angles used to generate the trajectory predictions.

20. The apparatus of claim 18, wherein the segment sequence manager is configured to generate the trajectory predictions using flight information by adjusting a prediction of the segments for the flight based on altitude winds.

* * * * *